United States Patent
Takano et al.

[11] Patent Number: 6,056,423
[45] Date of Patent: May 2, 2000

[54] AUTOMOTIVE ROOM LAMP ASSEMBLY

[75] Inventors: Tsunesuke Takano; Hiroshi Yabata, both of Topkyo, Japan

[73] Assignee: Daiichi Denso Buhlin Kabushiki Kaisha, Japan

[21] Appl. No.: 09/166,575

[22] Filed: Oct. 6, 1998

[30] Foreign Application Priority Data

Oct. 24, 1997 [JP] Japan .................................... 9-292505

[51] Int. Cl.⁷ .................................................. B60Q 3/02
[52] U.S. Cl. .......................................... 362/488; 362/490
[58] Field of Search .................................. 362/549, 548, 362/490, 488, 496, 365, 368

[56] References Cited

U.S. PATENT DOCUMENTS

5,526,241  6/1996  Ferrell ...................................... 362/290
5,671,996  9/1997  Bos et al. ................................. 362/494

Primary Examiner—Cassandra Spyrou
Assistant Examiner—Fayez Assaf
Attorney, Agent, or Firm—Nixon & Vanderhye P.C.

[57] ABSTRACT

The prior art automotive room lamp assembly has a problem that the designing and manufacturing of a variety of room lamp assembly including a large-sized or a small-sized one depending on the type of vehicle model inevitably involves a small lot production which entails the rise in the cost as well as the storage of many types of parts which again invites the rise in cost. The automotive room lamp assembly is composed of a housing 4 accommodating a lamp 42 in the recess 41 therein; a framework formed with a flange 51 to be secured on the periphery of said housing and having different sizes; and a lamp to be mounted onto the flange 53 of said framework.

3 Claims, 9 Drawing Sheets

AUTOMOTIVE ROOM LAMP ASSEMBLY

BACKGROUND OF THE INVENTION

1. Field of the Invention

The present invention relates to a room lamp assembly or the like equipped in the room of an automobile such as a room lamp assembly at the center of the ceiling of the automobile, a map lamp assembly equipped in front of the driver's seat, or a reading lamp assembly above the back seat and relates to a automotive room lamp assembly which enables to adapt to various design modifications by sharing a particular part and facilitate the cost reduction.

2. Prior Art

Figure 10:
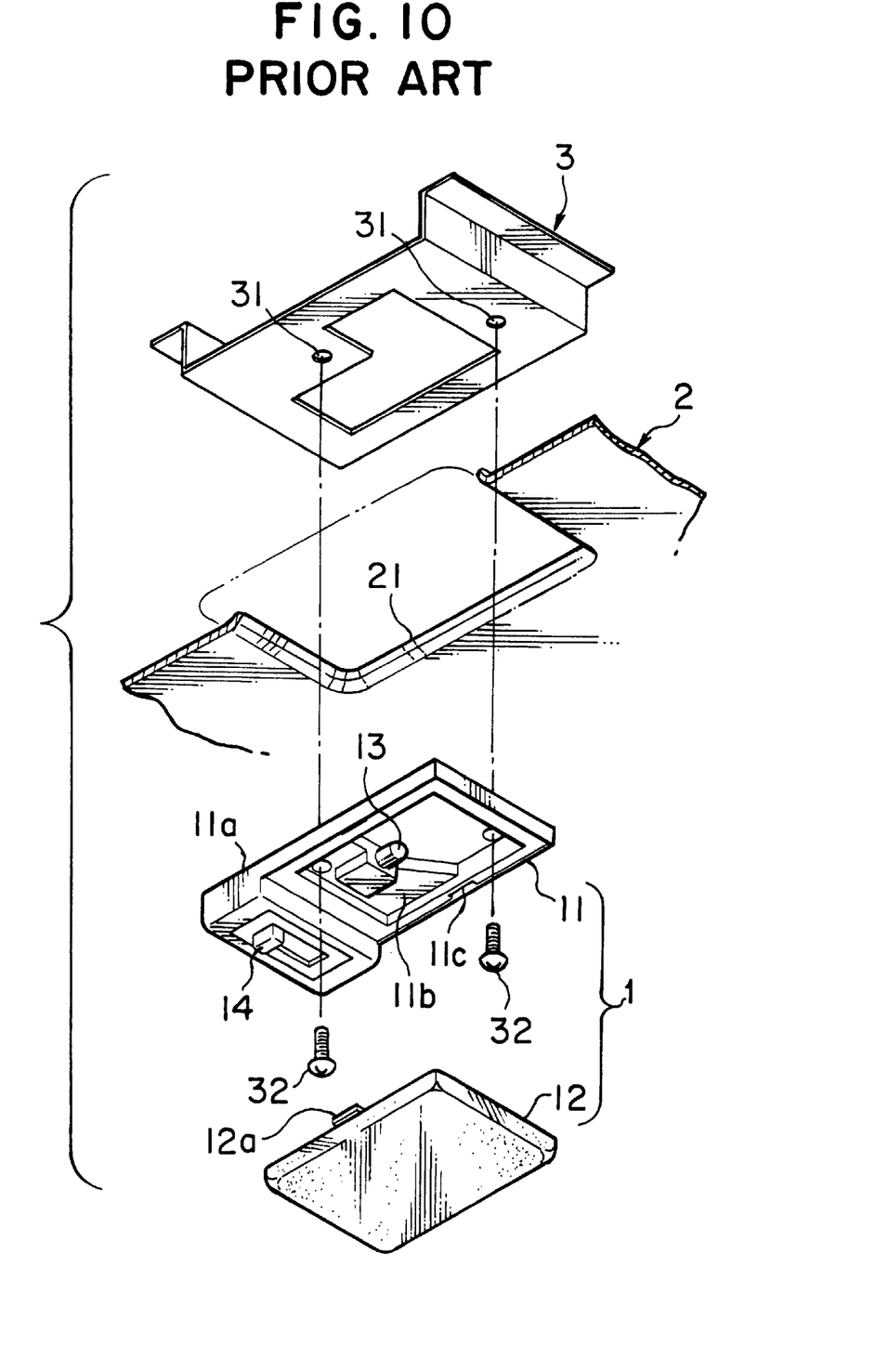
FIG. 10 is an exploded perspective view of the prior art.

FIG. 10 is an exploded perspective view of a prior art automotive room lamp assembly 1 which is to be mounted onto the ceiling of a vehicle, in which a housing 11 and a transparent or translucent lens 12 are combined into a automotive room lamp assembly. Said housing 11 has a periphery 11 defining an opening therein, said periphery being adapted to be engaged with an inner periphery 21 of an opening in a lining 2 of the ceiling at the time of fitting work.

Further, a lamp 13 is mounted to the inside of the recess 11b in the housing 11 while a switch 14 is mounted to the top thereof. Then, said lens 12 is sized to sufficiently cover the recess 11b in said housing 11. Said lens 12 has lugs 12a formed in opposite sides thereof to be fit into holes 11c formed in the housing 11.

Next, a mounting procedure thereof onto the ceiling of the vehicle will be explained. A mounting metal member 3 is inserted between a lining 2 and a steel roof to be secured by a screw 32 such that the lining 2 is sandwiched by the housing 1 and by fixedly engaging said lens 12 onto the housing 11, the room lamp assembly is secured onto the lining 2.

In this connection, the automotive room lamp assembly varies in sizes depending on the type of vehicles such as large or small cars or the like. In general, for example, a large room lamp assembly is used for a large vehicle. However, it is common that a deluxe car uses a large room lamp assembly regardless of the size thereof.

Therefore, with the conventional automotive room lamp assembly, it is required to design and manufacture various types in accordance with different vehicle models including large or small ones. As a result, small lot production which can entail cost increase for the manufacture thereof is needed. Further, the inventory cost is boosted because various parts used for the respective types must be stored.

SUMMARY OF THE INVENTION

The present invention has been made to solve the above described problems and its object is to provide an automotive room lamp assembly which is fitted for small lot production by sharing the same type of housing and is capable of cut down the storage cost as a result of storing a fewer number of parts.

The automotive room lamp assembly of the present invention is directed to achieve the above mentioned object and the means therefor includes a housing having a recessed portion wherein a lamp is accommodated; a framework to be fixedly mounted on an outer periphery of said housing, said framework having a flange of different size; and a lens to be detachably attached to said framework at a jaw portion thereof.

Further, said housing has a switch to turn on and off said lamp such that said switch has a knob to project out an opening formed in said lens and further, either one of the outer periphery of said housing and the flange of said framework is formed with a lug, the other one being formed with an engagement portion to which said lug is engaged into, the engagement of said lug with said engagement portion allowing said framework to be fixedly mounted onto said housing.

DETAILED DESCRIPTION OF THE EMBODIMENTS

Embodiment of the present invention relating to the automotive room lamp assembly will be explained hereinafter together with the attached drawings.

FIGS. 1 through 4 show the first embodiment and an explanation of similar characters and numerals used in FIG. 10 showing the above mentioned prior art will be omitted.

The automotive room lamp assembly of the present invention is composed of a housing 4, a framework and a lens 6.

The housing 4 is attached with a lamp 42 in a recess 41 formed therein as in the prior art lamp assembly and in this embodiment, a slide switch 43 is provided. The housing 4 has a flange portion 44 in the periphery thereof, said flange portion being formed with one engagement lug 45 at each longitudinal end portion of the housing and one such engagement lug 45 at each lateral intermediate portion of the housing, each engagement lug 45 having a resiliently cut out engagement pawl.

Said framework 5 is sized to be engaged with said housing 4 and is formed with a flange 51 extending inwardly to abut against the flange portion 44 of the housing when said housing 4 and said framework 5 are engaged with each other. Further, said framework 5 is formed with a flange 53 extending outwardly on the opposite side of said inwardly extending flange 51 with a vertical portion 52 therebetween. Said vertical portion 52 is formed with holes 54 into which lugs 61 of the lens 6 which will be explained later are to be engaged.

Now, said inwardly extending flange 51 may be sized to sufficiently cover to various sizes of the opening 21 in the lining 2 formed in the vehicle.

The lens 6 is formed of transparent or translucent resin to the size accommodatable to within the vertical portion 52 of the framework 5 such that lugs 61 formed in the two longitudinal portions therearound are engaged in said holes 54, said lens further being formed with an opening 62 at a position in facing relation to the knob of said slide switch 43.

Next, a method for mounting said room lamp assembly onto the vehicle will be explained hereinafter.

First, said framework 5 is attached around the housing 4 such that the resilient pawl of the engagement lug 45 formed in said housing 4 is overridden by the inner periphery of the flange 51 to lock the framework 4 and the housing 4 before said flange 51 abuts against the flange portion 44 of the housing 4. In this state, the housing 4 is secured by a screw 7 to the mounting metal member 3 supporting the same at the back of the lining 2 like the prior art such that the outer periphery of the flange 53 of the framework 5 is positioned to fit within the opening 21 in the lining 2 to be secured thereat.

Then, the lens 6 is inserted into the vertical portion 52 of the thus secured framework 5 such that the knob of the slide switch 43 is allowed to protrude out the hole 62 with the lugs 61 being engaged with the holes 54, thus completing the mounting of the lens 6 onto the framework 5.

Figure 1:
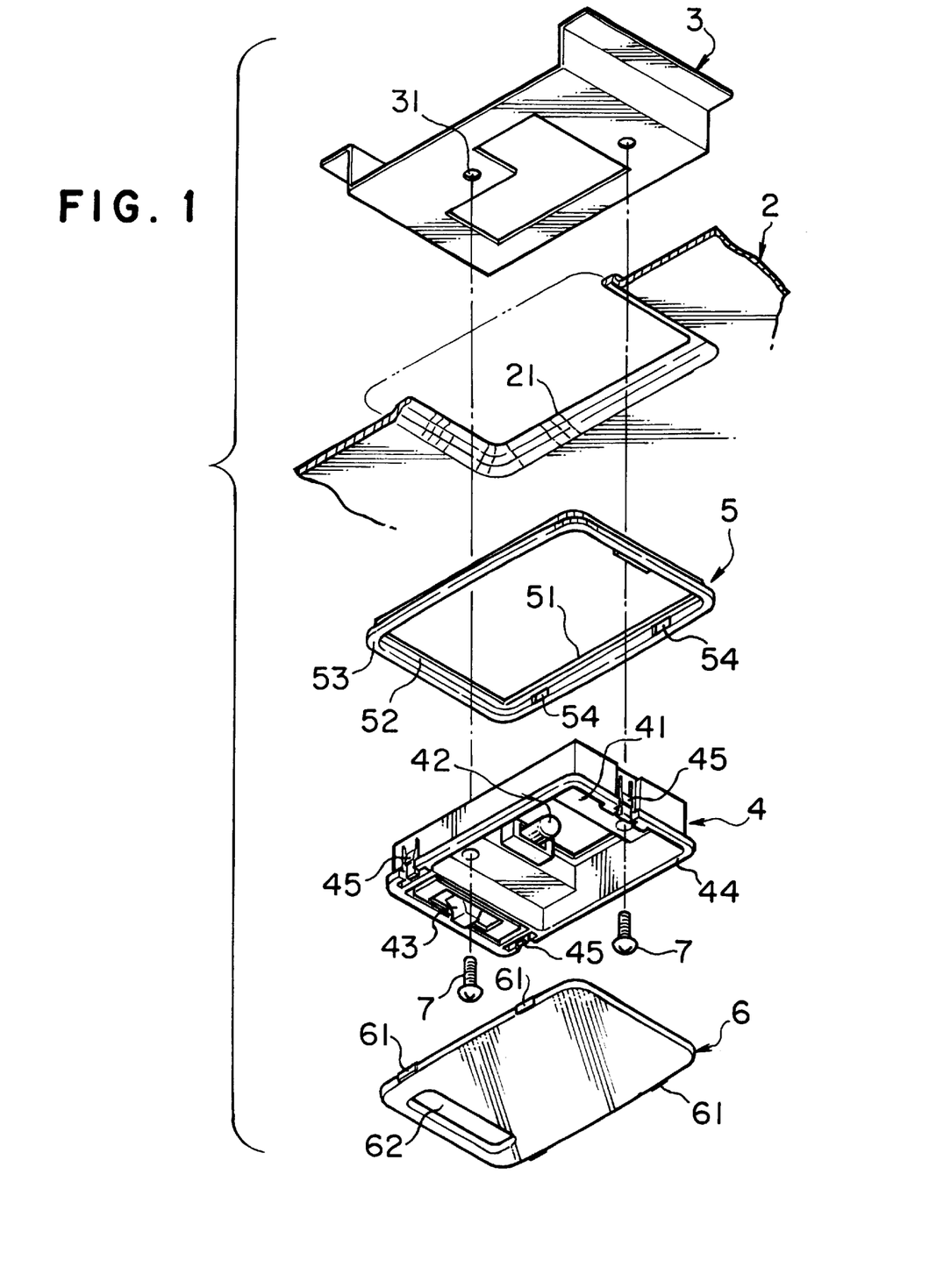
FIG. 1 is an exploded perspective view of the first mode of embodiment of the present invention showing an automotive room lamp assembly.
Figure 2:
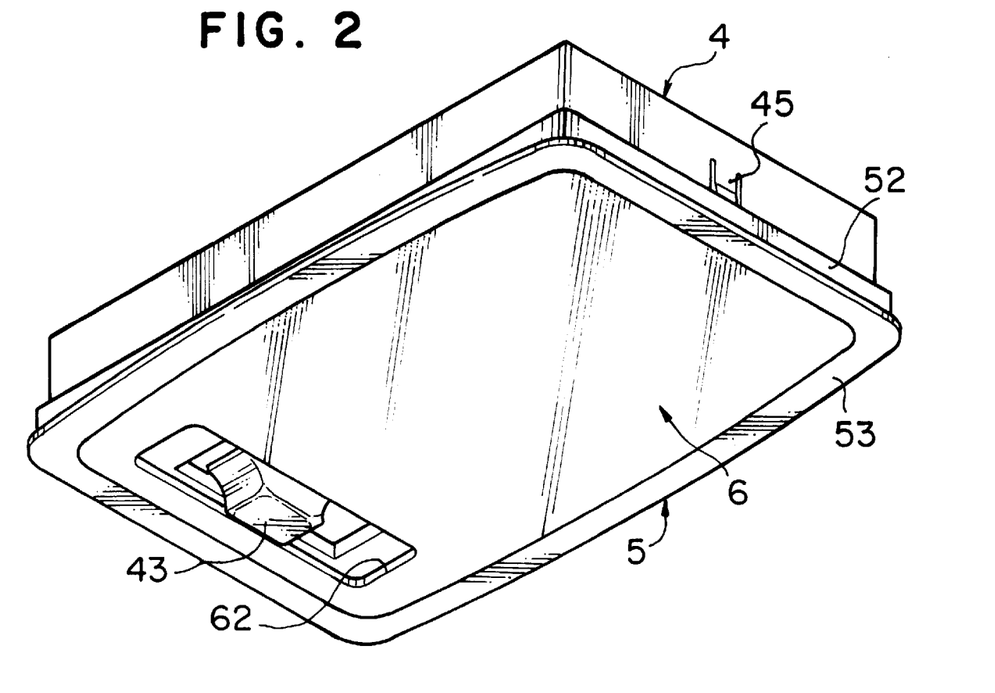
FIG. 2 is a perspective view of the above automotive lamp assembly in an assembled state.
Figure 3:
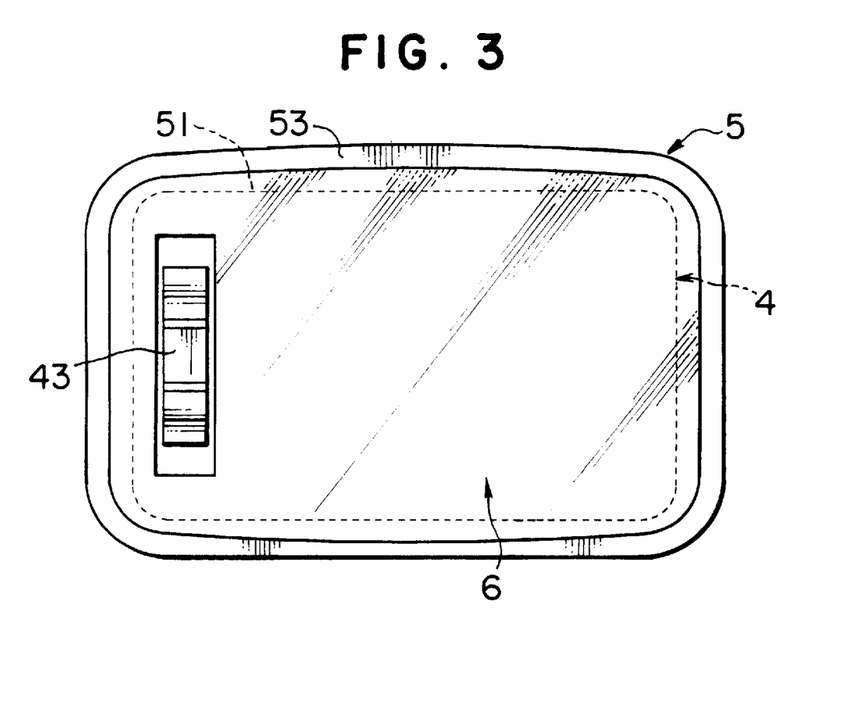
FIG. 3 is a plan view of FIG. 2.
Figure 4:
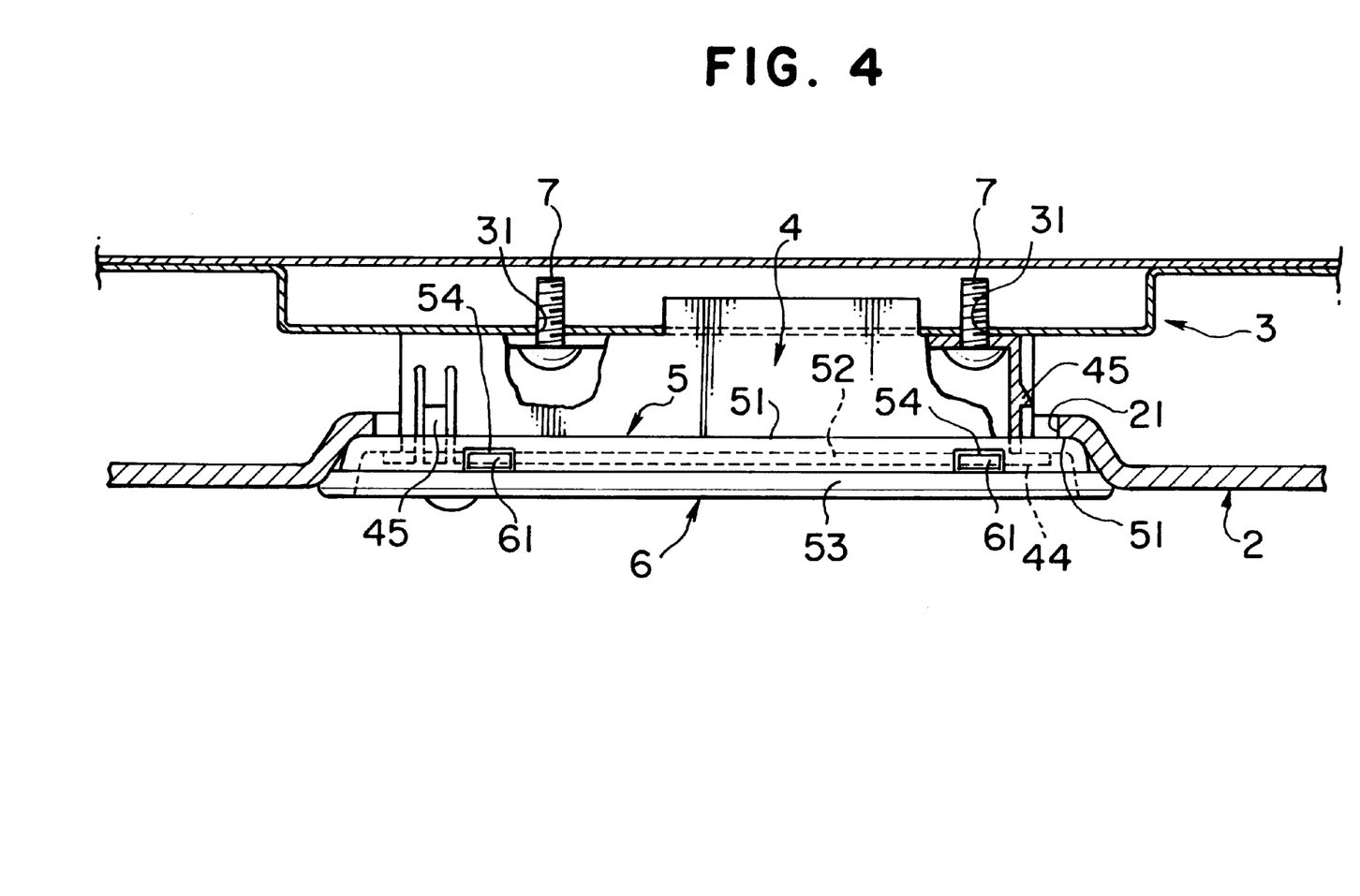
FIG. 4 is a side elevation of the mounted state thereof.
Figure 5:
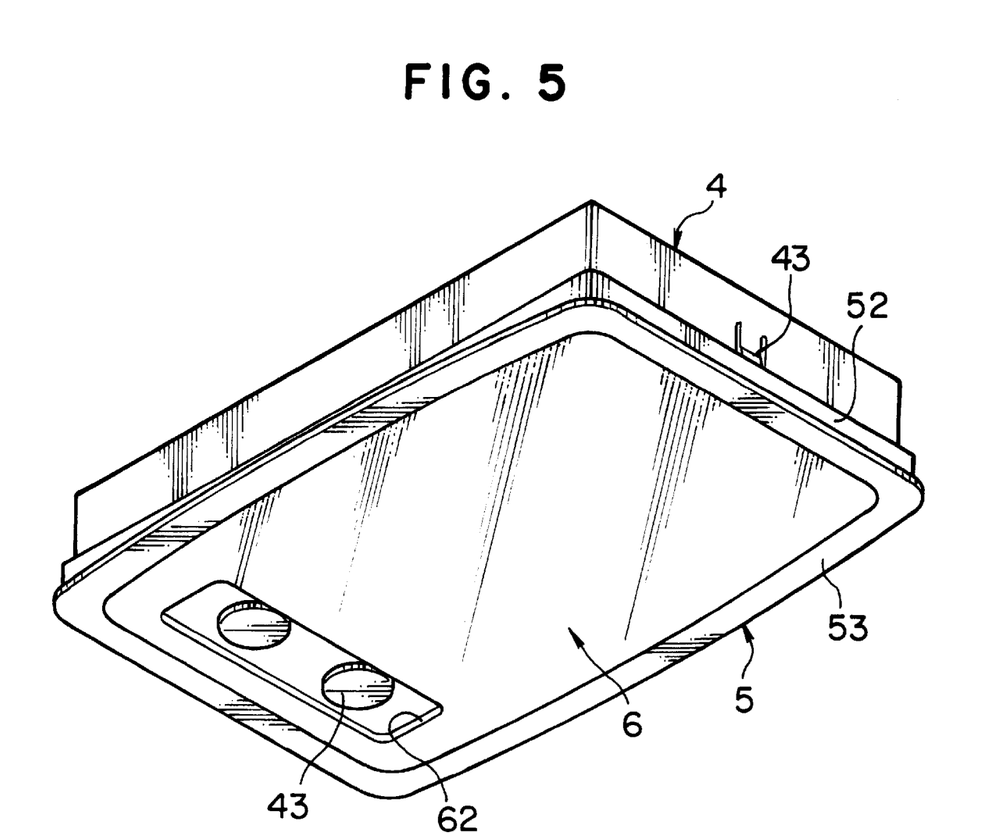
FIG. 5 is a perspective view of the second embodiment.

While the switch 43 is of the slide type in the first embodiment, a push type switch 43 may be used instead thereof in the second embodiment as shown in FIG. 5.

Figure 6:
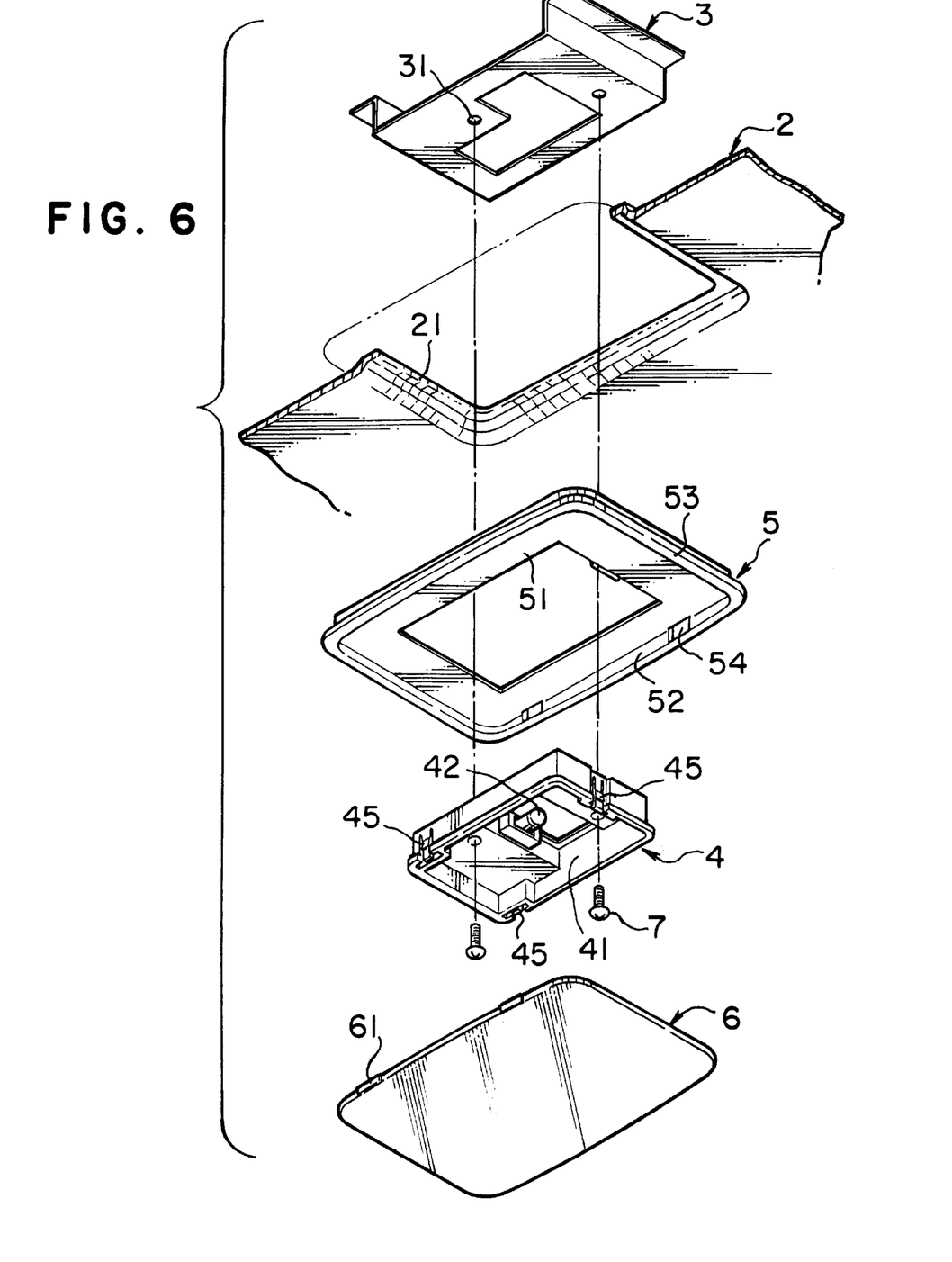
FIG. 6 is an exploded perspective view of the third embodiment.
Figure 7:
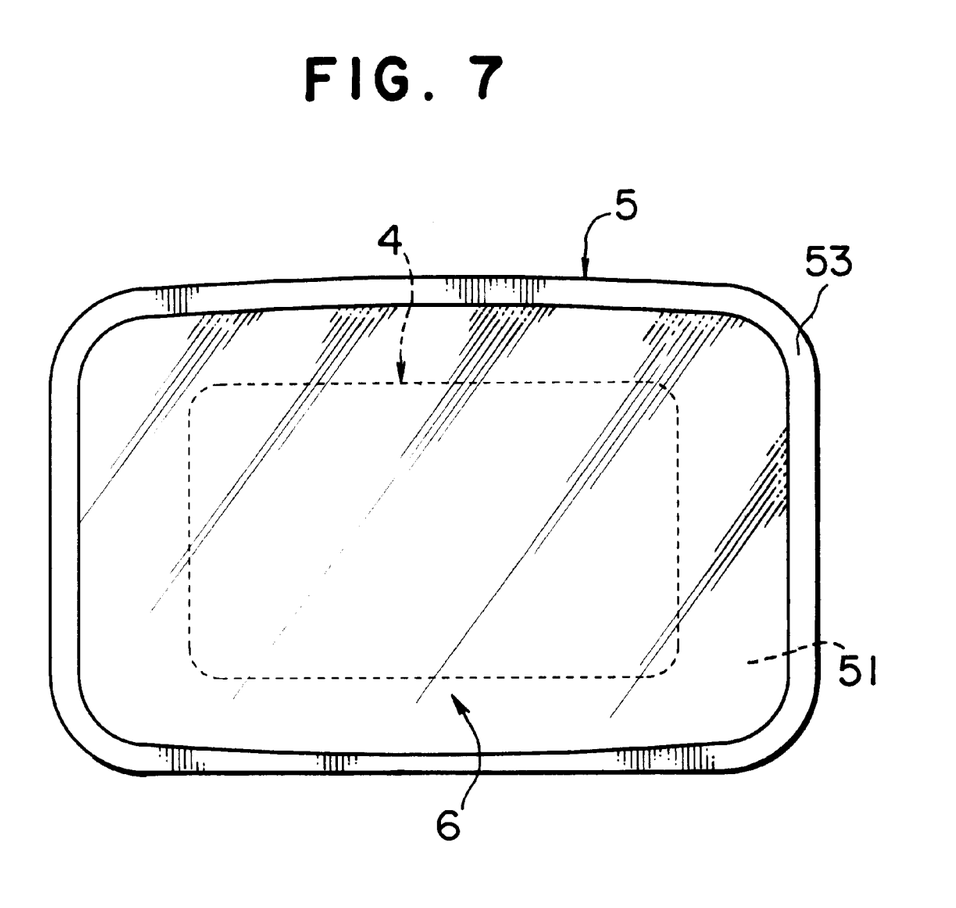
FIG. 7 is a plan view of the assembled state thereof.
Figure 8:
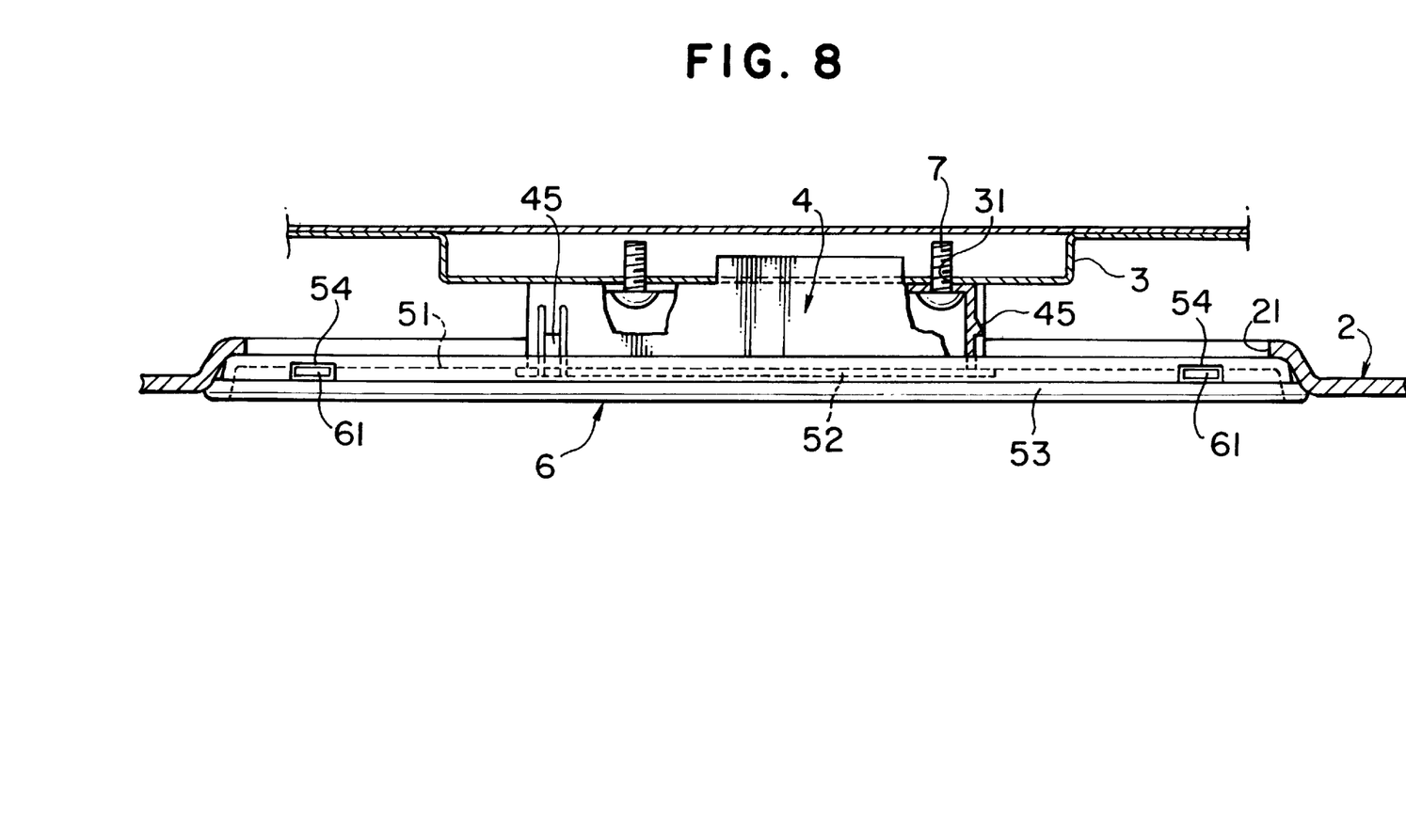
FIG. 8 is a side elevation of mounted state thereof.

The third embodiment shown in FIGS. 6 through 8 permits the flange 51 of the framework 5 to extend further so as to be adapted to large-sized vehicles which are formed with a wider opening 21 in the lining. More specifically, the outer periphery of the flange 51 is much further than the outer periphery of the housing 4 such that it is possible for the opening 21 in the lining 2 to be covered even if said opening 21 is wider.

Now, the housing 4 has no switch in this mode of embodiment, wherein the lamp is turned on when the trunk lid or the door is opened and is turned off when closed.

Figure 9:
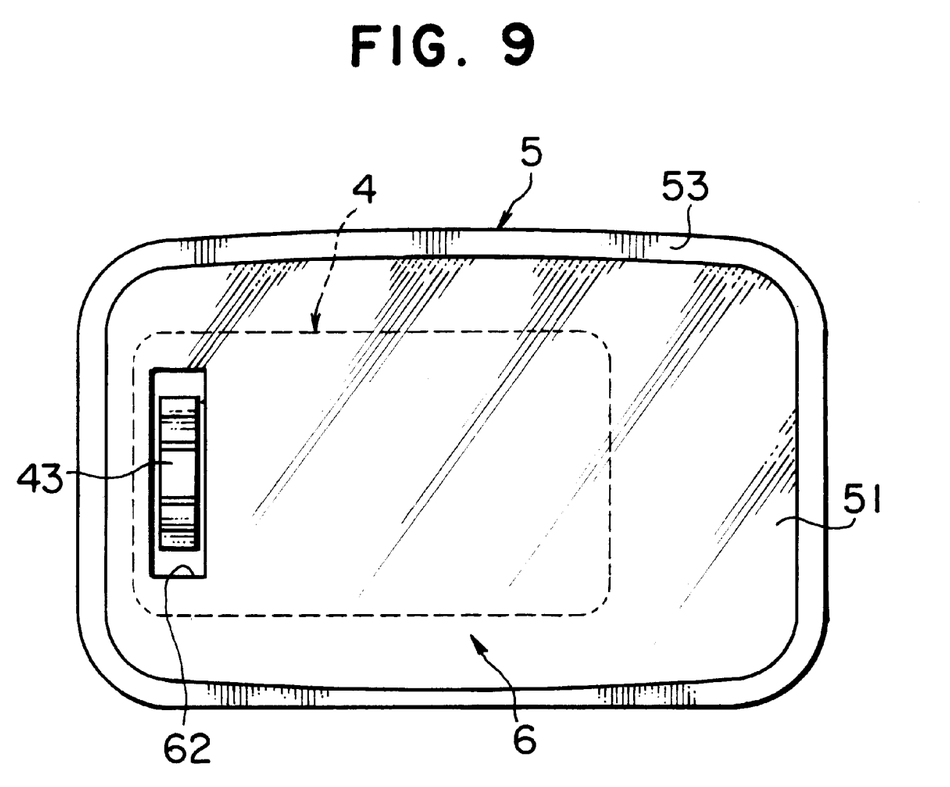
FIG. 9 is a plan view of the fourth embodiment.

Further, there is provided in the fourth embodiment shown in FIG. 9 the flange 51 of the framework 5 extending in an asymmetrical manner with respect to the housing 4 having switch 43 (similarly to that in the first embodiment) and the size of the extending portion is larger like to the counterpart in the third embodiment.

Therefore, in case where the lamp assembly with the flange 51 having such asymmetrical configuration in the extending portion is mounted to the ceiling of the vehicle, the housing 4 is secured with the mounting metal member 3 being set at an offset position from the center of the opening 21 in the lining 2.

In this connection, it is shown in all the embodiments described in the foregoing that the lugs 45 formed in the housing 4 are engaged with the flange 51 of the framework 5. However, the lugs may be formed in the inner periphery of the flange 51 to be engaged with holes formed in the housing 4.

Since the invention is composed of a housing attached with a lamp thereon, a framework having a flange portion to be secured to said housing, and a lens detachably attached to said framework, mounting thereof onto the ceiling having no matter how different sizes the opening in the lining has is possible by preparing a required number of frameworks of the flange of different sizes and lenses fitting thereto. Further, any change in designs may be made only in the framework and the lens, thus making the storage and administration of the parts simpler with lowered costs. The color of the housing may be selected from various coloration prepared in advance and such housing can be adapted to the ceiling depending on the color of the framework.

Further, since the room lamp assembly having a switch is designed such that the switch is protruded out the opening in the lens, only the lens with the knob protruding therefrom is visible except the ceiling, thus making the design novel. Further, the housing and the framework are secured through the engagement between the lugs and the engagement portions with the result that securing is done without use of any adhesive or the like to ensure the mounting is done with ease.

What is claimed is:

1. A universal automotive interior lamp system to accommodate both smaller and larger openings formed in an automotive interior lining, said assembly comprising:

a lamp housing assembly defining an external perimeter and operatively holding a lamp capable of illuminating the automotive interior when activated;

a smaller framework for attachment to the automotive interior lining so as to cover said smaller opening formed therein and having an inwardly directed smaller perimetrical flange member which defines a first mounting opening corresponding to said external perimeter of said lamp housing assembly;

a larger framework for attachment to the automotive interior lining so as to cover said larger opening formed therein and having an inwardly directed larger perimetrical flange member which has a dimension which is greater than that of said smaller perimetrical flange member of said smaller framework but which defines a second mounting opening which is identical in size as said first mounting opening; and a lens connectable to one of said smaller and larger frameworks and sized to cover said first and second mounting openings, respectively.

2. The automotive interior lamp system of claim 1, wherein said housing has a switch operatively connected to said lamp so as to selectively activate and inactivate the light.

3. The automotive interior lamp system of claim 1, wherein said housing includes a lug, and wherein said first and second mounting openings are each provided with an engagement portion adapted to engage the lug of said housing when said housing is inserted into said first and second mounting openings, respectively.

* * * * *